April 11, 1950 W. G. VAN VOORHIS ET AL 2,503,928
VARIABLE RATIO FORWARD AND REVERSE DRIVE MEANS
Filed Oct. 29, 1947 7 Sheets-Sheet 1

INVENTORS
William G. Van Voorhis.
Chris Gerst.
BY
ATTORNEYS

April 11, 1950 W. G. VAN VOORHIS ET AL 2,503,928
VARIABLE RATIO FORWARD AND REVERSE DRIVE MEANS
Filed Oct. 29, 1947 7 Sheets-Sheet 3

INVENTORS
William G. Van Voorhis.
Chris Gerst.
BY
ATTORNEYS

INVENTORS
William G. Van Voorhis.
Chris Gerst.
BY
ATTORNEYS

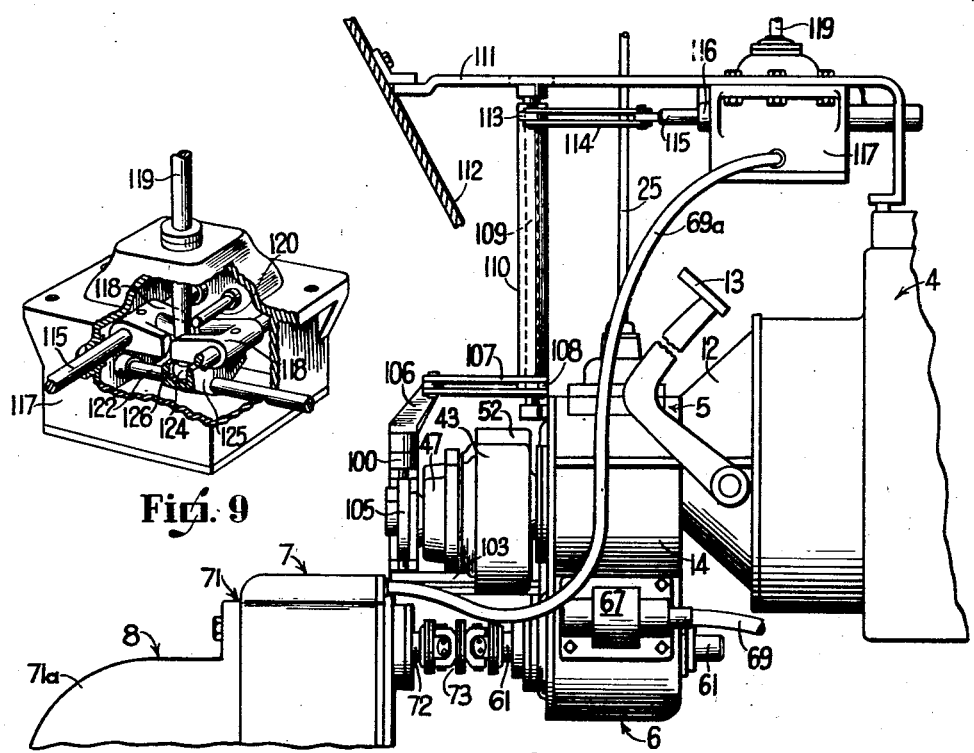

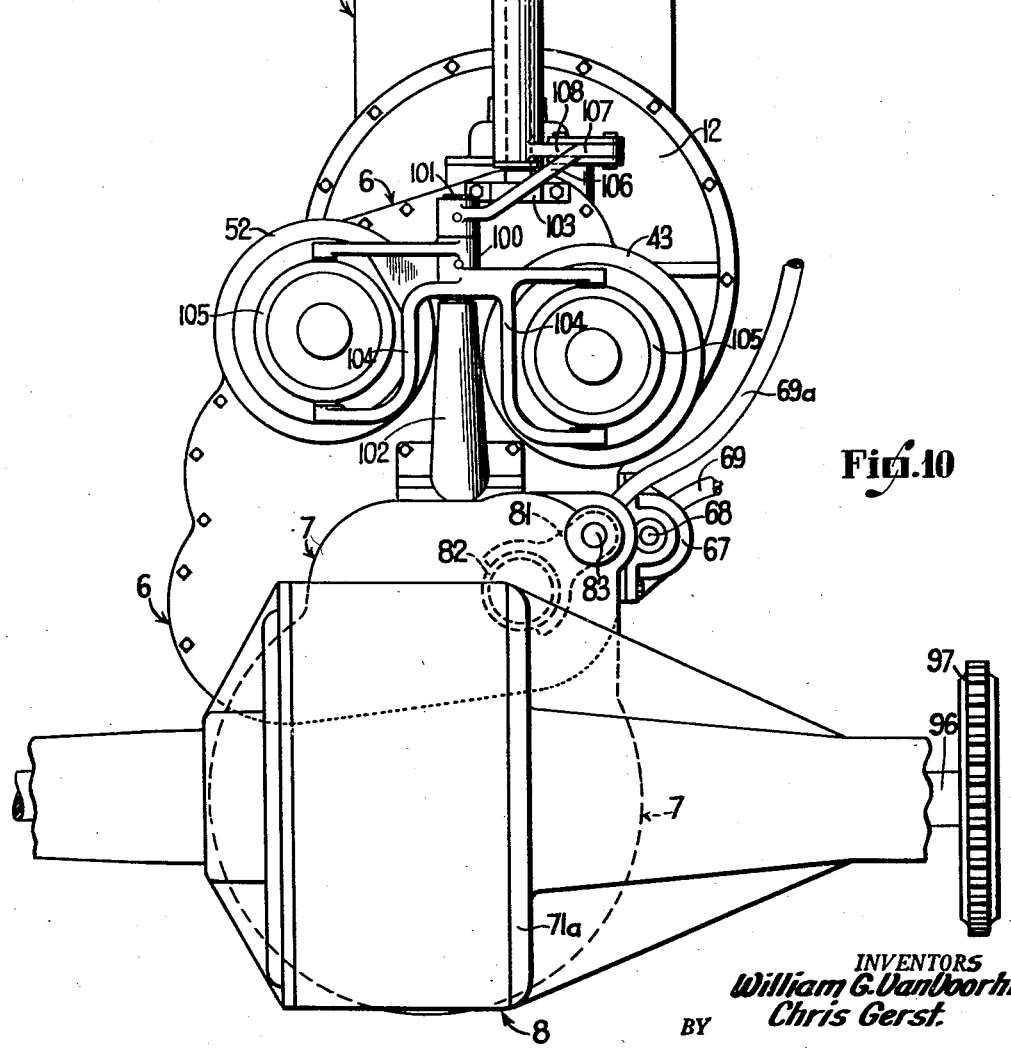

April 11, 1950 W. G. VAN VOORHIS ET AL 2,503,928
VARIABLE RATIO FORWARD AND REVERSE DRIVE MEANS
Filed Oct. 29, 1947 7 Sheets-Sheet 7

INVENTORS
William G. Van Voorhis.
Chris Gerst.
BY
ATTORNEYS

Patented Apr. 11, 1950

2,503,928

UNITED STATES PATENT OFFICE 2,503,928

VARIABLE RATIO FORWARD AND REVERSE DRIVE MEANS

William G. Van Voorhis, Knutsen, Iowa, and Chris Gerst, Dearborn, Mich., assignors to The Jaeger Machine Company, Columbus, Ohio, a corporation of Ohio Application October 29, 1947, Serial No. 782,698

7 Claims. (Cl. 74—745)

Our invention relates to variable ratio forward and reverse drive means. It has to do, more particularly, with a power transmission which is selectively controllable for selecting different ratios of forward to reverse speeds, depending upon the purpose for which the machine, in which the transmission is embodied, is employed.

Our invention is particularly applicable to transmissions for controlling the forward and reverse movement of portable machines but is not limited thereto and may be employed on other types of machines, for example, on machine tools for controlling the speed of work feeding and retracting. Our invention can be incorporated readily in any machine where it is desirable to provide a multiple speed drive and, for one intended use of the machine throughout a multiple range of speeds, the forward speeds are to be faster than the reverse speeds and then, for a different intended use of the machine throughout a multiple range of speeds, the reverse speeds are to be faster than the forward speeds. Such a drive could be used in ditching machines, for example, where digging is done in one direction and roading is done in the other direction, or on any piece of equipment where during normal operation of the machine, forward action is desired for a portion of the time and reverse action is desired during the remainder of the time and it is desirable to vary the ratio of the forward and reverse speeds, depending upon the use of the machine during a particular period.

In the following description, as an example of one use of our invention, we indicate how our invention is incorporated in a crane-loader, that is a combination crane and excavator.

When a machine of this type has the excavating attachment or bucket mounted thereon, it will be understood that it is desirable for the bucket to be advanced slowly into the material for excavating or loading of the material, the advancement of the bucket into the material being accomplished by forward movement of the machine at slow speed and with high power. Then to retract the bucket from the material to a discharge position, it is desirable to move the machine rearwardly at relatively high speed and low power. Thus, it is desirable to provide, throughout the range of digging speeds, retract speeds which are somewhat faster than the digging speeds. The advantages of this arrangement are obvious. When moving forward and picking up material, the main requirement is ample drawbar pull, and slow smooth traction; conversely, when backing up, the main requirement is to spot the machine so that the bucket is directly over the desired discharged point, usually a dump truck, in the least possible time. If the same machine is provided with a crane attachment, it is desirable that a different ratio of forward and reverse speeds be provided. It will be understood that throughout the loading and crane operating speed range, it is desirable to provide forward speeds which are somewhat faster than the reverse speeds. The reason for this is obvious since when the machine is moving forward, the operator has better visibility and better control over operation of the machine; conversely, when the machine is moving rearwardly, visibility and control by the operator is less. Our transmission provides an arrangement whereby it is possible to obtain in the crane-loader either ratio of forward to reverse speeds which is desirable for the particular purpose for which the machine is to be employed.

The transmission mechanism of our invention is disposed between a suitable power unit and the ultimate unit to be driven in a forward or reverse direction at a selected ratio of speeds which can be varied by properly controlling the transmission. Our transmission mechanism comprises a special transmission unit having an input shaft and an output shaft, the former shaft being driven by the power unit and the latter shaft serving to drive the input shaft of a second special transmission unit. This second unit has an output shaft which drives the ultimate unit or units to be driven by the transmission mechanism.

The input shaft of the first unit drives a pair of clutch shafts, each having a clutch associated therewith which may be selectively engaged to drive the output shaft of the first unit in either a forward or a reverse direction. Multi-speed gearing, including a shiftable pinion cluster, is provided between the input shaft of the first unit and the clutch shafts so that by shifting said pinion cluster, the clutch shafts will be driven at various speeds by the said input shaft. Gear trains are provided between the clutch shafts and said output shaft and are so arranged that the output shaft will be driven at different speeds in forward and reverse directions. We prefer to associate with these gear trains additional multi-speed gearing, including a pinion cluster, which can be shifted to further vary the speed of the said output shaft. Thus, the first transmission unit will serve to drive the input shaft of the second unit in a forward or reverse direction, depending upon which clutch of the first unit is engaged, and at a suitable range of speeds, depending upon the setting of the two sets of multi-speed gearing. Furthermore, regardless of the setting of such gearing, the forward speed will be different from the reverse speed, due to the arrangement of the gear trains between the clutch shafts and the output shaft of the first unit.

The input shaft of the second unit has a pinion cluster mounted thereon for axial movement and consisting of a pair of pinions of different sizes. The output shaft of such unit has different size driving gears keyed thereon which are selectively driven by said pinions upon proper shifting of the pinion cluster. The pinions and gears are selected and arranged so that the output shaft will be driven at different speeds, depending upon which of the pinions is selected to drive its associated driving gear. Thus, the second unit also includes shiftable gears for changing the speed of the output shaft. Between one of the said pinions and one of the driving gears, an idler is provided so that this combination of gearing will drive the output shaft in a different direction from the other combination of gearing including the other pinion. Thus, the second transmission unit is provided with shiftable gearing which not only changes the speed of the output shaft but also changes the direction of rotation of the output shaft.

The output shaft of the second unit is connected to the ultimate unit to be driven, for example, to the differential unit of a portable machine.

The control system which we provide for the transmission mechanism includes independent levers for shifting either of the pinion clusters of the first transmission unit to vary the speed setting thereof and, consequently, to vary the speed of the output shaft thereof. It also includes an additional control lever which is operatively connected to the pinion cluster of the second transmission unit, for shifting such cluster in order to vary the direction and speed of rotation of the output shaft of the second unit and also to actuate selectively the two clutches of the first unit to drive the output shaft thereof in either direction.

It will be apparent from the above general description that we provide transmission mechanism of such a nature that the final output shaft can be driven through a range of selected speeds in a forward or reverse direction. Furthermore, the forward speeds, throughout said range, will be at a different rate than the reverse speeds, for example, the forward speeds will be slower than the reverse speeds. By proper control of the transmission, this condition will be reversed, that is, the forward speeds will be faster than the reverse speeds.

A preferred embodiment of our invention is illustrated in the accompanying drawings wherein similar characters of reference designate corresponding parts and wherein:

Figure 7 is a side elevational view of the transmission mechanism, illustrating the control system associated therewith.

Figure 8 is a plan view of the structure shown in Figure 7.

Figure 9 is a perspective view, partly broken away, illustrating the control lever and associated parts which control the clutches of the first transmission unit and the speed and direction changing mechanism of the second transmission unit.

Figure 10 is a front view of the transmission mechanism and the differential mechanism which it drives.

Figure 11 is a vertical sectional view taken through the control mechanism of Figure 9.

Figure 12 is a similar view but taken along line 12—12 of Figure 11.

Figure 1:
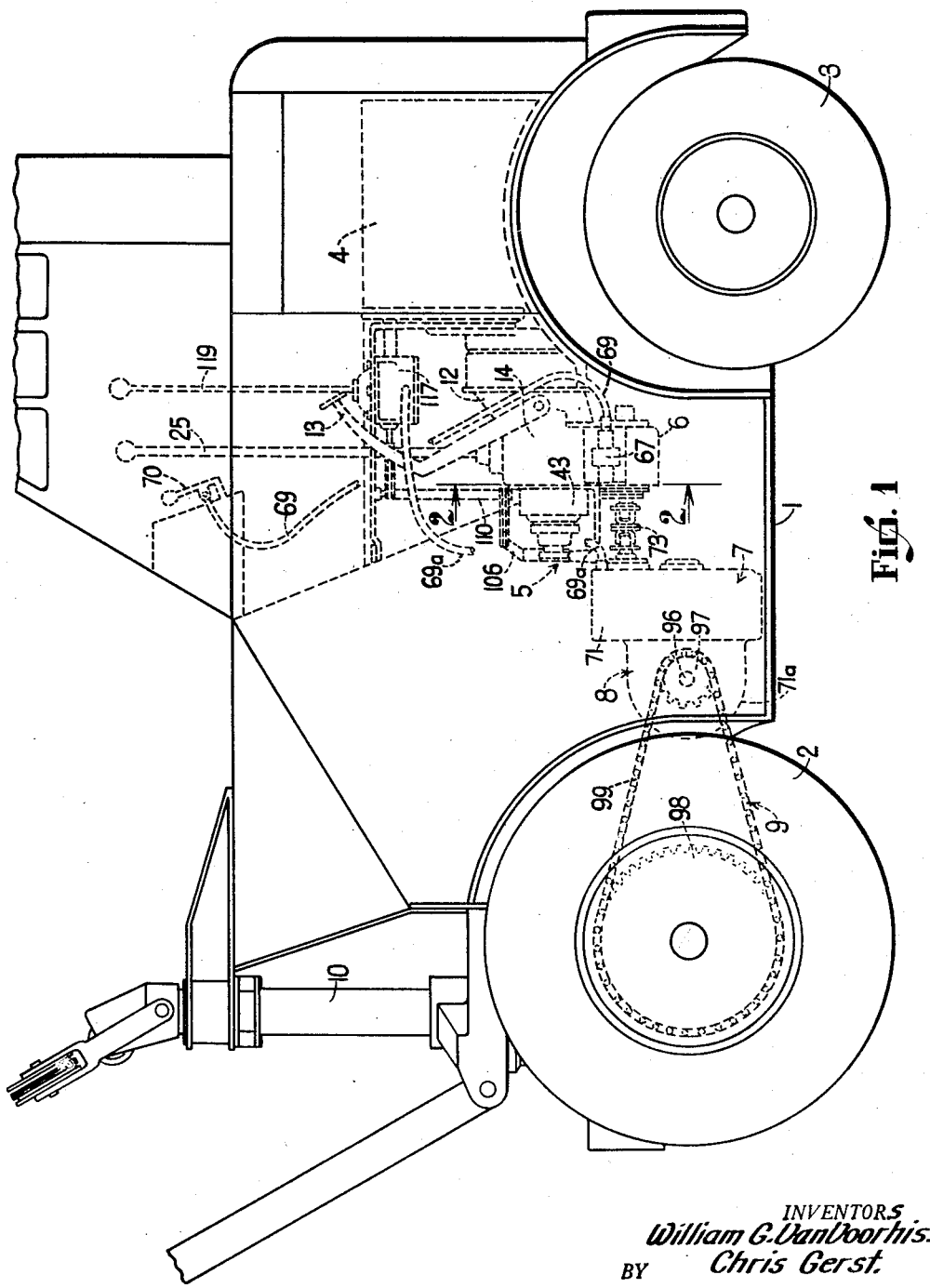
Figure 1 is a side elevational view illustrating how our invention may be incorporated in a portable machine of the crane-loader type.

With reference to the drawings, we have illustrated in Figure 1 a portable machine of the crane-loader type to which our transmission mechanism may be applied. This machine comprises a chassis 1 supported by forward propelling wheels 2 and rearward idler wheels 3. Supported at the rear end of the chassis is a suitable power unit 4, which serves to drive our transmission mechanism, illustrated generally by the numeral 5. This transmission mechanism 5 serves to transmit power from unit 4 to the forward wheels 2. Our transmission mechanism includes a first transmission unit 6 of special design directly driven by the power unit 4 and a second transmission unit 7 of special design driven by the unit 6 and associated with a differential unit 8 which drives the forward wheels 2. The differential unit 8 drives a chain and sprocket 9 associated with each of the forward wheels 2 of the machine.

The chassis at its forward end is provided with a vertically disposed rotatable supporting mast unit 10. This unit 10 may have associated therewith a crane attachment or a digging and loading attachment including a bucket or scoop. As previously indicated, if used for digging and loading, it is desirable to move the machine forwardly at a relatively low speed and to reverse it at a relatively high speed. On the other hand, if the machine is used as a crane, it is desirable to move the machine forwardly at a relatively high speed and to reverse it at a relatively low speed. The transmission mechanism 5 which we provide can be selectively actuated to drive the forward wheels 2 in such a manner that either of these forward to reverse ratios of speeds can be obtained.

Figure 2:
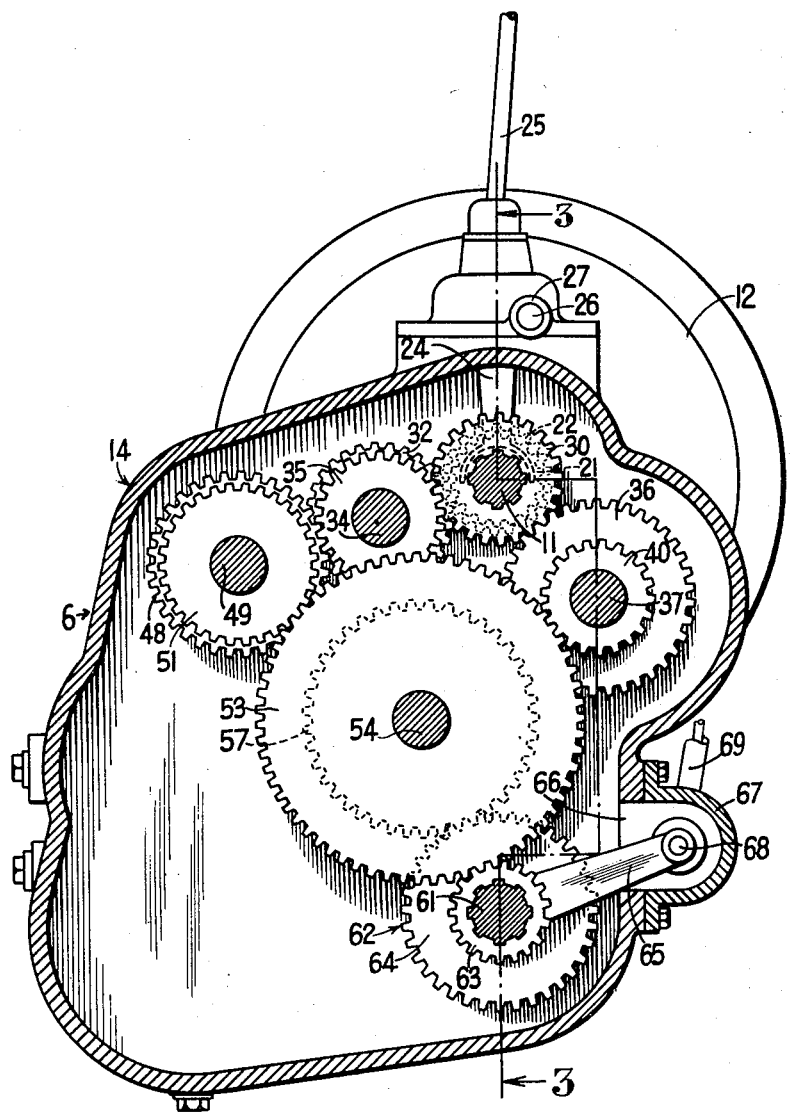
Figure 2 is a vertical transverse sectional view taken substantially along line 2—2 of Figure 1 through the first transmission unit which is driven by the power unit.
Figure 3:
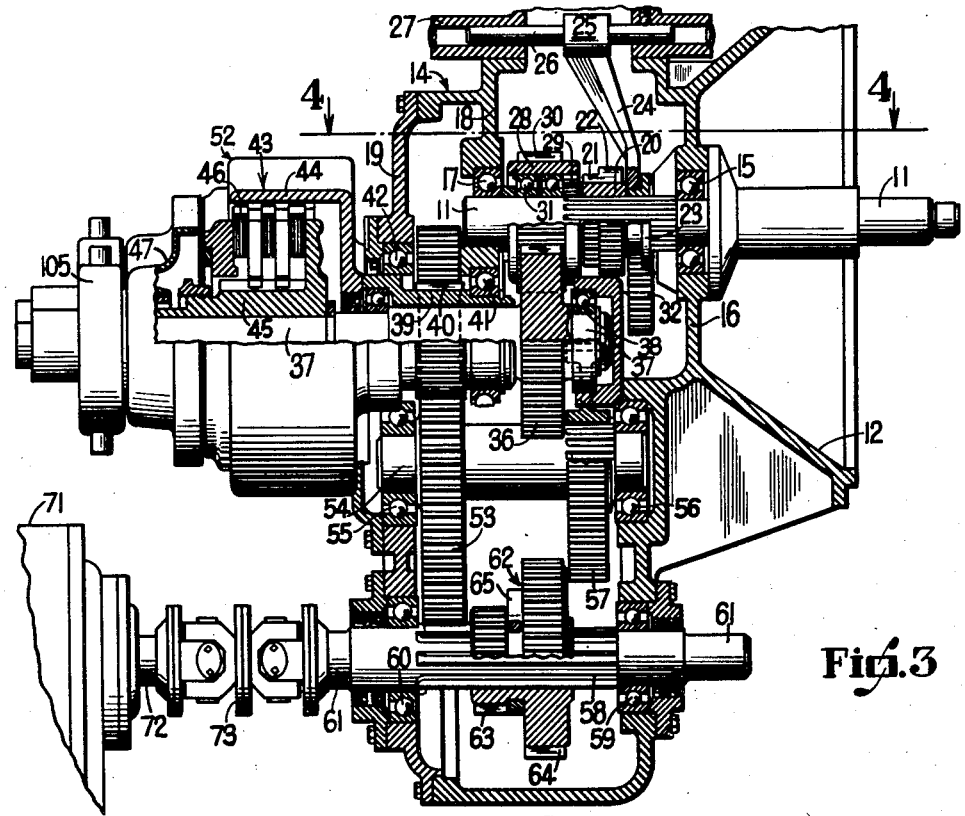
Figure 3 is a vertical sectional view taken substantially along line 3—3 of Figure 2.
Figure 4:
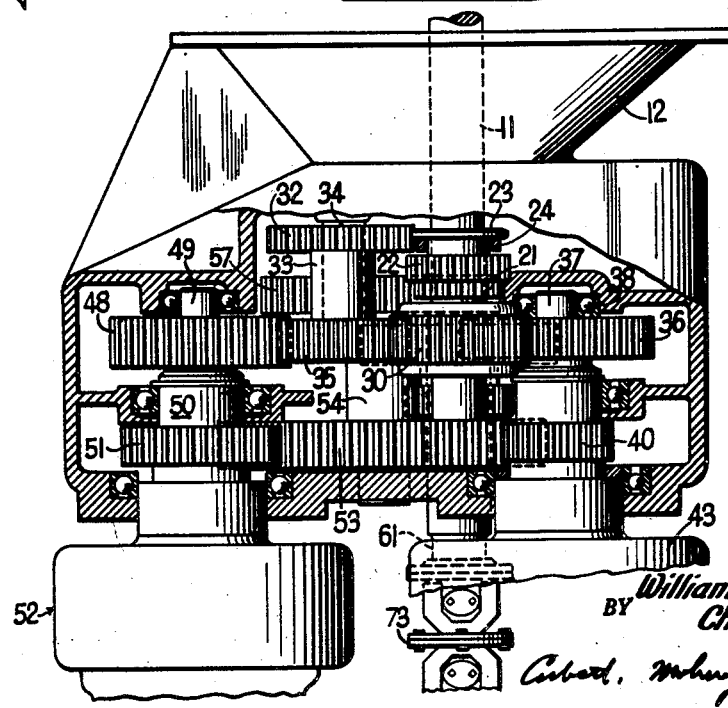
Figure 4 is a top view of the unit illustrated in Figure 3 and taken substantially along line 4—4 of Figure 3.

The first transmission unit 6 is illustrated best in Figures 2 to 4, inclusive, 7, 8 and 13. The unit 6 is disposed directly ahead of the power unit 4 and includes an input shaft 11 driven by the power unit through the medium of a clutch unit 12 of usual form which is actuated by a clutch pedal 13, as shown best in Figure 7.

Figure 13:
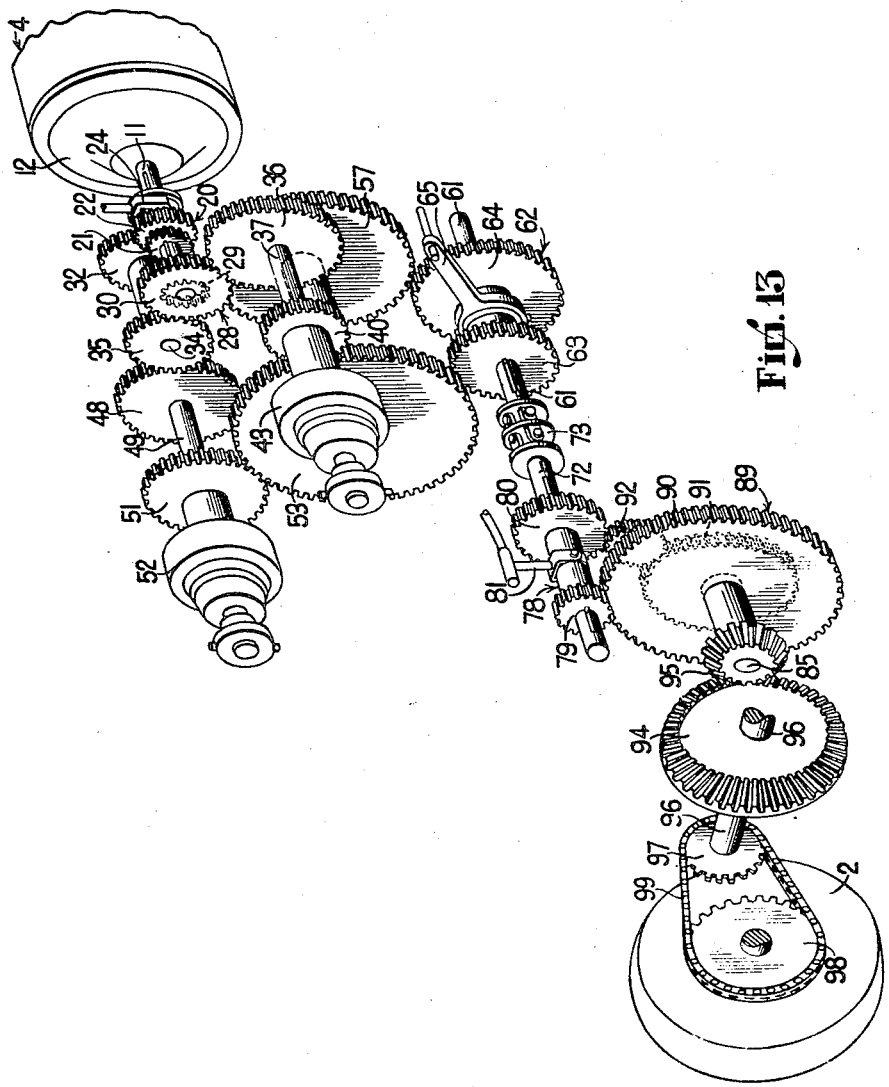
Figure 13 is a schematic view in perspective showing the main parts of the entire transmission mechanism.

The input shaft 11 of the unit 6 (Figures 2, 3 and 4) extends into the housing or casing 14 which encloses all of the mechanism of the unit 6. The shaft 11 extends forwardly from power unit 4 into the housing or casing 14 and is supported rotatably at the top of the casing by a ball bearing 15 disposed in a rear wall 16 of the casing and by a ball bearing 17 which is disposed in a wall section 18 of the casing that is closely adjacent to the forwardmost wall section 19 of the casing. The shaft 11 is also illustrated in Figure 13 but the casing is not shown in this figure. Forward of the wall 16, the shaft 11 has splined thereon for non-rotatable but axial movement a pinion cluster 20. This cluster 20 includes a small pinion portion 21 and a larger pinion portion 22. It also includes a collar portion 23 which is embraced by a yoke portion 24 formed on the lower end of a lever 25. The arrangement of the lever 25 is illustrated best in Figures 1, 2, 7 and 8. As shown in Figure 3, the lower end of the lever is carried on a pin 26 which is slidably mounted parallel with shaft 11 in sleeve bearings 27 supported on top of the casing 14. The portion 21 of pinion cluster 20 is adapted to cooperate with a pinion 28 which has internal teeth 29 (Figure 3) and external teeth 30. The pinion 28 is disposed forwardly of the cluster 20 on shaft 11 and between it and the wall section 18. The member 28 is freely rotatably mounted on shaft 11 by means of ball bearings 31. The larger portion 22 of pinion cluster 20 is adapted to cooperate with a pinion 32 which is carried on the rear end of a sleeve 33 (Figure 4) which is rotatably mounted on a forwardly projecting pin 34 that is anchored to the rear wall 16 of the casing slightly left of and lower (Figure 2) than shaft 11 with which it is parallel. The sleeve 33 carries on its forward end a pinion 35 with which the teeth 30 of pinion 28 mesh at all times.

The teeth 30 of pinion 28 also mesh at all times with the driving gear 36 which is keyed on the right hand clutch shaft 37 (Figures 2, 4 and 13) adjacent its rear end which shaft is rotatably carried in a ball bearing 38 that is mounted in a wall section 16a spaced forwardly of the rear wall 16 of the casing. It will be noted that shaft 37 is forwardly of, at the right of, and slightly below but parallel to shaft 11. Rotatably disposed on the shaft 37 (Figures 3 and 4) directly ahead of the gear 36 is a sleeve 39 which carries an integral gear 40 on its outer surface. The rear end of this sleeve 39 is rotatably carried in a ball bearing 41 which is supported in the wall section 18 and the forward end of this sleeve is rotatably supported in a ball bearing 42 carried by the forward wall 19. Thus, the shaft 37 will rotate when gear 36 is driven without rotating the sleeve 39 and the gear portion 40. To clutch the sleeve 39 to the shaft 37, when desired, a suitable friction clutch unit 43 is associated with the forward end of shaft 37 which projects through and beyond the forward wall 19 of the casing.

The clutch unit 43 may be of any suitable type but is illustrated in Figure 3 as comprising a housing or driven member 44 which is associated with the sleeve 39 so that it will rotate therewith. It also includes a driving element 45 which is splined to the shaft 37 for axial but non-rotatable movement relative thereto. A series of interfitting driving and driven friction discs or collars 46 are carried, respectively, by members 45 and 46. These discs are forced together in the usual manner to engage the clutch and cause member 45 to drive member 44. For this purpose, a shiftable collar 47 is splined on the end of shaft 37 and when moved axially will move the driving member 45 axially relative to driven member 44.

The pinion 35 also meshes continuously with a driving gear 48 (Figure 4) which is keyed on the rear end of the left hand clutch shaft 49 which is disposed parallel to the clutch shaft 49 and the pin 34 and slightly below such pin, as shown in Figure 2. This clutch shaft 49 also has rotatably mounted thereon a sleeve 50, similar to sleeve 39, which carries a gear 51. The clutch shaft 49 is supported on the casing in exactly the same manner as the clutch shaft 37 and the sleeve 50 is supported in association with the shaft 49 in the same manner that the sleeve 39 is supported in association with the shaft 37. Furthermore, a clutch unit 52 is associated with the forwardly projecting end of shaft 49 and is identical to the clutch unit 43 which is associated with the shaft 37. By operating clutch unit 52, the sleeve 50 can be clutched to the shaft 49 for rotation therewith.

The driven gears 40 and 51 mesh with a large driving gear 53 which is keyed on the forward end of a countershaft 54 that is disposed between the clutch shafts 37 and 49, parallel thereto and at a slightly lower level, as shown best in Figures 2 to 4 and 13. The forward end of the shaft 54 is carried by a ball bearing 55 (Figure 3) which is mounted in the forward wall 19 of the casing and the rear end of this shaft is rotatably carried by a ball bearing 56 which is mounted in the rear wall 16 of the casing. The rear end of this countershaft 54 has a smaller driving gear 57 keyed thereon.

Below the level of the shaft 54, slightly to the right thereof, as shown best in Figures 2, 3, and 13, is the output shaft 58 of the unit 6. This output shaft projects rearwardly through the rear wall 16 of the casing and is rotatably mounted in a ball bearing 59 (Figure 3) provided in such wall. The forward end of this shaft projects through the forward wall 19 of the casing and is supported by a ball bearing 60 mounted in such wall. The rear end of the shaft 58 is provided with a portion 61 which may drive other units. The forwardly projecting end of the output shaft 58, as will later appear, is connected to the second transmission unit 7 for the purpose of driving it. Splined on the shaft 58 for axial movement is a gear cluster 62 which includes a small forward gear 63 and a larger rear gear 64. For shifting this gear cluster 62 axially of shaft 58, a shifting yoke 65 (Figures 2, 3 and 13) engages the cluster 62 between the gears 63 and 64. This yoke 65 has an arm extending outwardly through a slot 66 (Figure 2) of the casing into a shifter housing 67 which slidably supports a pin 68 that is parallel to shaft 58 and is shifted by means of a push-pull linkage 69 which runs to a control lever 70 (Figure 1) mounted at a suitable point on the machine.

The operation of the transmission unit 6 will now be understood readily by referring particularly to Figure 13. The power unit 4 is connected to unit 6 by operating the main clutch 12 by means of the clutch pedal 13. This will drive the input shaft 11. If the pinion cluster 20 is in neutral position, neither the pinion 28 nor the pinion 32 will be driven. Since pinion 28 is freely mounted on shaft 11 the shaft will rotate without rotating pinion 28. Depending upon the speed desired for clutch shafts 37 and 49 which depends upon the speed required at the output shaft 58, the pinion cluster 20 is shifted axially of input shaft 11 by actuating the lever 25. For example, if the cluster 20 is moved forwardly, the pinion 21 will be moved within pinion 28 to engage the internal teeth 29 thereof and drive the pinion 28. The pinion 28 will drive idler pinion 35 and gear 48 on clutch shaft 49 and will directly drive gear 36 on clutch shaft 37. Because the idler pinion 35 is interposed between pinion 28 and gear 48 while no such pinion is provided between pinion 28 and gear 36, the clutch shafts 37 and 49 will be driven in opposite directions. For example, if shaft 11 and pinion 28 are driven in a clockwise direction (Figure 2) the gear 36 and shaft 37 will be rotated in a counter-clockwise direction while the gear 48 and shaft 49 will be rotated in a clockwise direction. If the cluster 20 is shifted rearwardly so that pinion 22 engages pinion 32, the pinion 35 will directly drive the gear 48 and will also drive pinion 28 which, in turn, will drive gear 36. This will cause the shafts 37 and 49 to be driven in the same directions as before but at a different speed because the pinion 22 is larger than the pinion 21. The clutches 43 and 52 are controlled by mechanism which will be described later so that when one is engaged the other is disengaged. When clutch 43 is engaged, the gear 40 is clutched to shaft 37 and is driven thereby. Gear 40 drives the gear 53, which is carried by shaft 54, and the gear 57, which is also carried by such shaft. The gear 53 is also meshing with gear 51 which will merely freely rotate on clutch shaft 49, since clutch 52 is not engaged. On the other hand, if clutch 43 is disengaged and clutch 52 is engaged, the gear 51 will be clutched to shaft 49. Consequently, shaft 49 will drive gear 51, gear 53, shaft 54 and gear 57. The gear 40 at this time will merely freely rotate on shaft 37, since clutch 43 has been disengaged. It will be noted that pinions 28 and 35 are of the same size and that gears 36 and 48 are of the same size. Consequently, although the clutch shafts 37 and 49 are rotated in opposite directions, they are rotated at the same speed. Furthermore, it will be noted that gear 51 is much larger than the gear 40. Consequently, these gears 40 and 51 not only serve to rotate the gear 53 in opposite directions, when selectively clutched to their respective shafts 37 and 49, but will also serve to rotate this gear 53 at a different speed in one direction than it is rotated in the opposite direction. If the gear cluster 62 is in neutral position, as shown in Figure 13, the output shaft 58 will not be driven. However, the gear cluster can be shifted by means of the control lever 70 (Figure 1) axially in either direction so that the small gear 63 will engage gear 53 or the larger 64 will engage the gear 57. The ratio between gears 63 and 53 will be different from that between gears 64 and 57. Consequently, when gear 53 is the driving gear, the shaft 58 will be driven at a different speed than when gear 57 is the driving gear.

It will be evident that the clutches 43 and 52 may be selectively actuated to drive the output shaft 58 in opposite directions. Furthermore, because of the provision of the gears 40 and 51 of different sizes, the forward and reverse rotation of the output shaft 58 will be at different speeds. The speed of rotation of the shaft 58 either in a forward or a reverse direction can be varied within a predetermined range because of the provision of the shiftable pinion cluster 20 and the shiftable gear cluster 62.

The transmission unit 7 is illustrated best in Figures 5, 6, 7, 8, and 13. It comprises a casing 71 (Figure 5) from which the input shaft 72 of this unit projects rearwardly. The rear end of the shaft 72 is coupled to the forward end of the output shaft 58 of unit 6, with which it is axially aligned, by means of a universal coupling 73 of a suitable type which is shown best in Figures 5, 7, and 13. Thus, the input shaft 72 of the unit 7 will be driven in either direction by the output shaft 58 of the unit 6.

Figure 5:
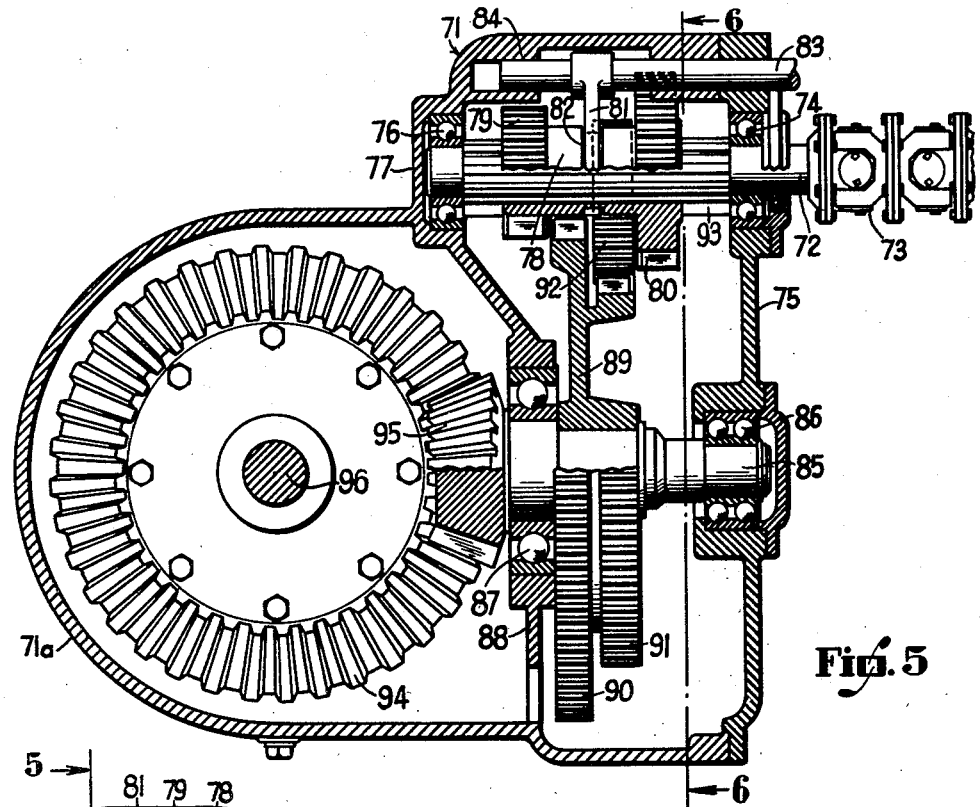
Figure 5 is a vertical sectional view through the second transmission unit which drives the differential unit of the machine.
Figure 6:
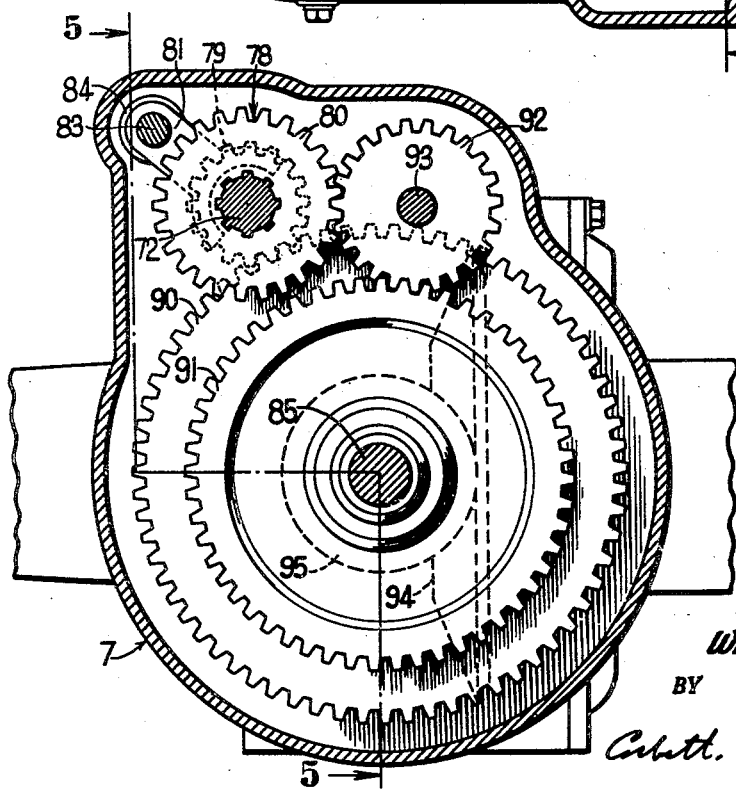
Figure 6 is a vertical sectional view through said second transmission unit taken substantially at right angles to that of Figure 5 and substantially along line 6—6 of Figure 5.

As shown in Figure 5, the input shaft 72 has its rear end rotatably carried by a ball bearing 74 mounted in the rear wall 75 of the casing 71. The forward end of shaft 72 is rotatably carried by a ball bearing 76 which is carried by a forward upper wall section 77 of casing 71, it being noted that the shaft 72 is supported at the upper left hand side of the casing, as shown best in Figure 6. A pinion cluster 78 is splined on the shaft 72 for axial movement. This cluster 78 comprises a small forwardly disposed pinion 79 and a larger rearwardly disposed pinion 80. For shifting the pinion cluster 78 axially, a yoke 81 embraces collar portion 82 thereof. This yoke 81 is carried by a pin 83 which is mounted parallel to shaft 72 for axial movement in sleeve bearings 84 carried by the top part of casing 71. The pin 83 will be shifted axially by means which will be described later.

Parallel to and below but to the right (Figure 6) of input shaft 72 is a countershaft 85. This shaft 85 (Figure 5) has its rear end rotatably supported by a ball bearing 86 carried by the rear wall section 75 and its forward end rotatably supported by a ball bearing 87 carried by a forward wall section 88. The shaft 85 has keyed thereon a gear cluster 89 which includes a forwardly disposed larger gear 90 and a rearwardly disposed smaller gear 91. Meshing with the smaller gear 91 at the upper side thereof is an idler pinion 92. This pinion 92 is carried by a shaft 93 which is parallel to shafts 72 and 85. The shaft 93 is supported in the upper part of casing 71 by bearings (not shown) similar to the bearings 74 and 76 which support the shaft 72.

When the pinion cluster 78 is in neutral position, as shown in Figure 13, the pinions 79 and 80 will be driven without driving any other gears. However, if the cluster 78 is shifted forwardly, the smaller pinion 79 will engage and drive the larger gear 90. This will also rotate the smaller gear 91 which will drive pinion 92 which will, at this time, be out of mesh with the pinion 80. If the pinion cluster 78 is shifted in the opposite direction, the pinion 79 will move out of engagement with the gear 90 and the pinion 80 will move into engagement with the idler pinion 92. The pinion 80 will drive pinion 92 which will, in turn, drive smaller gear 91. The gear 90 will be rotated at the same time but it will be out of mesh with the pinion 79. Thus, the shaft 85 will be driven at different speeds depending upon which of the pinions 79 and 80 is selected as the driving pinion, due to the difference in ratios between pinion 79 and gear 90 and beteween pinion 80, pinion 92 and gear 91. Furthermore, because the idler pinion 92 is interposed between pinion 80 and gear 91, the shaft 85 will be driven in a different direction when pinion 80 is the driving pinion than when pinion 79 is the driving pinion.

The shaft 85 serves as the output shaft of the unit 7. It is adapted to drive the ultimate unit to be driven by our transmission mechanism. In the machine illustrated, the shaft 85 drives the differential unit 8. This unit 8 is a standard differential unit and includes a ring gear 94 (Figures 5 and 13) of the bevel type which is engaged by a driving pinion 95 carried on the forward end of shaft 85. The differential unit is enclosed in a forwardly extending portion 71a (Figure 5) of the casing 71. The differential unit drives the oppositely projecting shafts 96 which carry the driving sprockets 97 of the sprocket drives 9. Sprockets 97 drive sprockets 98, which are associated with wheels 2, through the medium of the sprocket chains 99, as shown best in Figures 1 and 13.

We provide a control system for selectively engaging one of the clutches 43 and 52 and disengaging the other and for independently shifting the pinion cluster 78 of the transmission unit 7 when desired. This control mechanism is illustrated best in Figures 7 to 12 inclusive. It will be noted from Figure 10 that directly ahead of the clutches 43 and 52 a lever 100 is provided. This lever 100 extends transversely and is mounted for horizontal swinging movement about a vertically disposed pin 101 (Figure 8) which is rotatably supported in a vertically disposed bearing sleeve 102 that is carried by a plate 103 disposed between casings 14 and 71 and suitably attached thereto. The lever 100 is keyed to the pin 101 and is provided with oppositely extending yoke portions 104 which straddle the operating collars 105 of the clutches, such collars 105 being rotatably connected by suitable means (not shown) to the axially movable collars 47 (Figure 3) of the clutches. It will be apparent that when lever 100 is swung about the axis of pin 101, one of the clutches will be engaged while the other will be disengaged. For swinging the lever, an operating arm 106 is keyed on the upper end of pin 101 whereby such pin can be rotated. The arm 106 is connected by a pivoted link 107 (Figure 8) to arm 108 which is keyed on the lower end of a vertically disposed shaft 109. This shaft is rotatably mounted in a vertically disposed sleeve 110 (Figures 7 and 10 which is suitably supported at its lower end by being attached to the forward side of casing 14 and at its upper end by being attached to a horizontally disposed plate 111 which has its rear end supported by the power unit 4 and its forward end supported by a plate 112 of the machine. The upper end of shaft 109 has a crossarm 113 keyed thereon and the forward ends of horizontally extending links 114 are pivotally connected to the outer ends of this crossarm. These links 114 extend rearwardly and are pivotally connected to the forward ends of forwardly extending parallel pins 115.

The pins 115, as shown best in Figures 9 and 12, are slidably mounted in suitable sleeve bearings 116 formed as a part of the small casing 117 which is supported at the rear end of plate 111. Within the casing 116, the pins 115 are provided with U-shape lever receiving members 118 which are fixed in horizontal position and are directed towards each other but have their inner ends spaced from each other slightly. The lower end of a shifting lever 119 extends downwardly through these members 118 and can be shifted laterally to a position completely within either of the members 118. Oppositely disposed pins 120 are provided parallel to pins 115 for preventing forward or rearward shifting of lever 119 when it is in the position shown in Figure 9, that is, in alignment with the spaces between the adjacent inner ends of members 118. This will prevent simultaneous engagement of the two clutches 43 and 52. It will be apparent that by shifting the lever 119 laterally in either direction, its lower end will be moved into one of the members 118. Then if the lever is shifted forwardly or rearwardly, the pin 115 carrying that member 118 will be moved axially. This swings the crossarm 113 horizontally which rotates shaft 109 and swings the arm 108 on its lower end horizontally. This exerts a push or pull on link 107 which swings the lever 100 about the axis of pin 101 and engages one of the clutches and disengages the other. The same action will occur regardless of which member 118 the lever 119 is laterally shifted into before being moved forwardly or rearwardly.

The lever 119 is also used for shifting the cluster pinion 78 of unit 7. As previously indicated cluster 78 is shifted by shifting the yoke member 81. This yoke member is shifted through the medium of the control linkage 69a (Figure 7) which extends from casing 117 to casing 71. It is operated by means of an axially movable pin 122 which is disposed at right angles to the pins 115, as shown best in Figures 9, 11 and 12. The pin 122 is slidably mounted in sleeve bearings 123 carried by the casing 117. Axial movement of pin 122 will produce, through the medium of linkage 69a, axial movement of pin 83 and, therefore, movement of yoke 81 and axial movement of pinion cluster 78. The pin 122 is also shifted axially by the lever 119. The extreme lower end of this lever is provided with a ball portion 124 which fits into a socket member 125 rigidly secured to pin 122. This socket member is channel-shaped and is horizontally disposed, the channel 126 formed therein extending at right angles to the axis of pin 122, that is, in the same direction as the axes of pins 115. The lever 119 is pivoted for universal movement at a point spaced above its lower end by means of a ball and socket mounting 127.

With this control arrangement, the lever 119 can be shifted laterally to move the pin 122 and thereby to shift the pinion cluster 78 of unit 7. The lower end of the lever will upon this lateral swinging movement move into one of the members 118 carried by pins 115. If the lever is thereafter shifted in a forward or reverse direction, the selected pin 115 will be moved forwardly or rearwardly and the clutches 43 and 52 will be actuated, one being engaged while the other is disengaged. Thus, with this control system the cluster 78 of unit 7 can be shifted to change the setting of the gears to provide for a change both in the speed and direction of rotation of the output shaft 85. After the unit 7 is actuated in this manner, one of the clutches can then be engaged but this can be accomplished only after the cluster 78 has been shifted in either direction. Engaging one of the clutches 43 and 52 completes the drive to the output shaft 85.

Normally the transmission mechanism is controlled merely by actuating the lever 119. The lever is moved laterally first to actuate the cluster 78 of transmission unit 7 and is then moved forwardly or reversely to actuate the clutches 43 and 52. The lever 119 is moved laterally only when the machine is to be used for a different purpose and it is desired to have a different ratio of forward to reverse speeds. Normally the lever is set in and remains in a selected member 118 and is shifted forwardly and rearwardly to engage and disengage selectively the clutches 43 and 52. When one of these clutches is engaged, the output shaft 85 of unit 7 will be driven at a different speed than when the other clutch is engaged. If this ratio is to be reversed, the lever 119 is shifted laterally into the other member 118 which causes shifting of the cluster 78 of the unit 7. Thus, the forward and reverse speeds will always be at a different ratio because of the different size gears 40 and 51 associated with clutches 43 and 52 respectively. However, this ratio of speeds can be reversed by shifting the cluster 78 of unit 7 and changing the gear setting of such unit so that both the direction and speed of rotation of the shaft 85 is changed. The speed of rotation of the output shaft 85 can also be varied within a predetermined range by setting the levers 25 and 70 to different positions to shift the gear clusters 21 and 62 of the transmission unit 6.

The clutch 43 will at one time be the forward drive clutch and the clutch 52 the reverse drive clutch when the cluster 78 of unit 7 is in one position. However, in another position of member 78, the clutch 52 will be the forward drive clutch and the clutch 43 will be the reverse drive clutch.

When the machine is used as an excavator and loader and a bucket attachment is associated with the mast 10, it is desirable that the machine be propelled forwardly, to crowd the bucket into the material, at a slower speed than rearwardly when the bucket is to be moved to a discharge position as quickly as possible, as previously indicated. Therefore, during the use of the machine for this purpose, the slower driving clutch, that is clutch 43, should be the forward drive clutch and the faster driving clutch, that is clutch 52, should be the reverse drive clutch. Furthermore, the cluster 78 of unit 7 is so set that the slow speed will be forward and the faster speed will be in a reverse direction, that is, the cluster is set so that small pinion 79 engages gear 90 and, consequently, the slower forward drive gear arrangement between input shaft 72 and output shaft 85 is selected. With this setup of our transmission mechanism, it will be apparent from Figure 13 that when clutch 43 is engaged, the gear 40, since it is rotating in a counterclockwise direction, drives gear 53 clockwise, shafts 58 and 72 and pinion 79 counterclockwise through gear 63 or 64, gear 91, shaft 85 and pinion 95 clockwise, and, therefore, rotates shafts 96 forwardly, through the medium of differential 8. Forward rotation of shafts 96 rotates the wheels 2 forwardly, through the medium of chain and sprocket drives 9 and the machine is thereby propelled forwardly at a relatively slow speed. On the other hand, when clutch 52 is engaged, the gear 51, since it is rotating in a clockwise direction, drives gear 53 counterclockwise, shafts 58 and 72 and pinion 79 clockwise through gear 63 or 64, gear 91, shaft 85 and pinion 95 counterclockwise, and, therefore, rotates shafts 96 rearwardly, through the medium of differential 8. Reverse rotation of shafts 96 rotates the wheels 2 in a reverse direction, through the medium of chain and sprocket drives 9 and the machine is thereby propelled rearwardly at a relatively high speed.

This particular ratio of slow forward to fast reverse speeds will continue as long as the position of cluster 78 of unit 7 is not changed. The clusters 20 and 62 of unit 6 may be shifted to vary the forward or reverse speed but the slow forward and high reverse speed relationship still will be maintained. However, if the machine is to be used for a different purpose, for example, as a crane and it is desired to have relatively fast forward and slow reverse speeds, the cluster 78 of unit 7 is shifted so that pinion 80 engages idler 92. Thus, the drive gear arrangement between input shaft 72 and output shaft 85 is selected which will reverse the direction of rotation of shaft 85 produced by rotation of shaft 72 with the cluster 78 in its previous position. Since the drive through shaft 85 will now be through pinion 80, idler 92, and gear 91, the direction of rotation of shaft 85 is reversed and, also, due to the different ratio of this gearing, the speed of shaft 85 is also changed. With this setup, when clutch 43 is engaged, the shafts 58 and 72 are still driven in a counterclockwise direction. Pinion 80 is driven in a counterclockwise direction which drives idler 92 clockwise and gear 91, shaft 85 and pinion 95 counterclockwise, and, therefore, rotates shafts 96 rearwardly through the medium of differential 8. Thus, the wheels 2 are rotated rearwardly by engaging clutch 43, rather than forwardly as in the previous instance upon engaging clutch 43 when pinion 79 was the driving pinion for shaft 85 and the machine was used for excavating. Furthermore, when slow driving clutch 40 is engaged and the pinion 80 is the driving pinion for shaft 85, the wheels 2 are not only driven rearwardly but also at a faster rate of speed, due to the use of larger driving pinion 80, than when the pinion 79 was the driving pinion and the clutch 40 was engaged to drive the wheels forwardly. When fast driving clutch 52 is engaged and the pinion 80 is the driving pinion for shaft 85, the output shaft 85 will be driven at a faster speed in a clockwise direction, thereby propelling the machine forwardly at a higher rate of speed than the reverse movement accomplished by engaging the clutch 40. This forward movement, due to the use of pinion 80 rather than pinion 79 as the driving pinion for shaft 85, will be at a faster speed than the rearward movement accomplished by engaging such clutch 52 when the pinion 79 was the driving pinion and the machine was used for excavating.

It will be apparent from the above that when the machine is used for one purpose, for example, excavating, the slow driving clutch 43 is the forward clutch and the fast driving clutch 52 is the reverse clutch. At this time the slow driving pinion 79 is being used. When the machine is to be used for another purpose, for example, as a crane, the slow driving clutch 43 will be the reverse clutch and the fast driving clutch 52 will be the forward clutch. At this time the faster driving pinion 80 is being used. Thus, in one instance there is provided a ratio of slow forward to fast reverse speeds and in the other instance there is provided a ratio of fast forward to slow reverse speeds. However, due to the use of the different driving pinions 79 and 80 in the first and second instances, respectively, the slow forward speed is different from the slow reverse speed and the high reverse speed is different from the high forward speed. This particular arrangement of speeds is provided because when the machine is being used as a crane, higher speeds are permissible in both directions than when the machine is being used as an excavator.

One of the advantages of the particular control mechanism which we provide for actuating the clutches 53 and 42 and for shifting the cluster 78, is that the upper end of the control lever 119 is always swung in a forward direction to produce forward movement of the machine and in a rearward direction to produce rearward movement of the machine. For example, when lever 119 is shifted so that its lower end swings into the left hand member 118 (Figure 9) to shift pinion 79 into engagement with gear 90, forward movement of the upper portion of lever 119 will produce rearward movement of such member 118 and the pin 115 which carries it. This will engage the low speed forward drive clutch 43. Rearward movement of the upper end of the lever 119 will engage the high speed reversing clutch 52. On the other hand, if the lower end of the lever is swung into the left hand member 118 to engage pinion 80 with pinion 92, when the upper portion of lever 119 is swung forwardly the lower end is moved rearwardly, moving pin 115 which carries such member 118 rearwardly and, thereby, engaging the fast forward drive clutch 52. Rearward movement of the upper end of the lever 119 will now engage the low speed reversing clutch 43.

From the above description, it will be apparent that the transmission unit 6 provides a high speed and low speed drive in opposite directions. Furthermore, the speed in each direction can be varied without changing the high speed and low speed relationship of the drive in opposite directions. The transmission unit 7 provides means for reversing the relationship of high speed and low speed drives and for also changing the speed of the high speed drive and that of the low speed drive. Thus, our transmission mechanism as a whole provides a high speed drive and low speed drive in opposite directions, and means for changing the condition of relative speed to relative direction and simultaneously changing the speed in each direction.

Various other advantages will be apparent from the preceding description, the drawings and the following claims.

Having thus described our invention, what we claim is:

1. Transmission mechanism comprising an input shaft and an output shaft, a pair of clutch shafts, gearing connecting the input shaft to the clutch shafts for driving them in opposite directions, a clutch associated with each of said shafts, means for selectively engaging one of said clutches and simultaneously disengaging the other of said clutches, an intermediate shaft, gearing connecting said clutch shafts to said intermediate shaft and serving to drive said intermediate shaft at different speeds when the respective clutches are engaged, said last-named gearing being shiftable to vary within a selected range the speed of rotation of said intermediate shaft, and shiftable gearing interposed between the intermediate shaft and the output shaft for selectively changing the direction of rotation of the output shaft, said last-named shiftable gearing comprising sets of gears of different ratios for varying the speed of rotation of said output shaft while simultaneously changing its direction of rotation.

2. Transmission mechanism comprising an input shaft and an output shaft, a pair of clutch shafts, gearing connecting the input shaft to the clutch shafts for driving them in opposite directions, a clutch associated with each of said shafts, means for selectively engaging one of said clutches and simultaneously disengaging the other of said clutches, said gearing between the input shaft and the clutch shafts being shiftable to vary within a selected range the speed of rotation of said clutch shafts with either of said clutches engaged, an intermediate shaft, gearing connecting said clutch shafts to said intermediate shaft and serving to drive said intermediate shaft at different speeds when the respective clutches are engaged, said last-named gearing being shiftable to vary within a selected range the speed of rotation of said intermediate shaft, and shiftable gearing interposed between the intermediate shaft and the output shaft for selectively changing the direction of rotation of the output shaft, said last-named shiftable gearing comprising sets of gears of different ratios for varying the speed of rotation of said output shaft while simultaneously changing its direction of rotation.

3. Transmission mechanism comprising a first transmission unit including an input shaft and an output shaft, a pair of clutch shafts, gearing connecting the input shaft to the clutch shafts for driving them in opposite directions, a clutch associated with each of said shafts, means for selectively engaging one of said clutches and simultaneously disengaging the other of said clutches, gearing connecting said clutch shafts to said output shaft and including gear trains of different ratios serving to drive said output shaft at different speeds when the respective clutches are engaged, said last-named gearing also including multi-speed gearing shiftable for varying the speed of rotation of said output shaft with either of the clutches engaged, a second transmission unit including an input shaft coupled to the output shaft of the first unit and an output shaft adapted to drive a desired unit, a pair of trains of gears interposed between the input shaft of the second unit and the output shaft thereof, one of said trains of gears serving to drive the output shaft in one direction and the other serving to drive the output shaft in an opposite direction, said trains of gears also serving to vary the speed of rotation in each direction, and means for selecting either of said trains of gears to drive said output shaft of the second transmission unit.

4. Transmission mechanism comprising a first transmission unit including an input shaft and an output shaft, a pair of clutch shafts, gearing connecting the input shaft to the clutch shafts for driving them in opposite directions, a clutch associated with each of said shafts, means for selectively engaging one of said clutches and simultaneously disengaging the other of said clutches, said gearing between the input shaft and the clutch shafts including shiftable multi-speed gearing for varying the speed of rotation of the clutch shafts within a selected range, gearing connecting said clutch shafts to said output shaft and including gear trains of different ratios serving to drive said output shaft at different speeds when the respective clutches are engaged, said last-named gearing also including multi-speed gearing shiftable for varying the speed of rotation of said output shaft with either of the clutches engaged, a second transmission unit including an input shaft coupled to the output shaft of the first unit and an output shaft adapted to drive a desired unit, a pair of trains of gears interposed between the input shaft of the second unit and the output shaft thereof, one of said trains of gears serving to drive the output shaft in one direction and the other serving to drive the output shaft in an opposite direction, said trains of gears also serving to vary the speed of rotation in each direction, and means for selecting either of said trains of gears to drive said output shaft of the second transmission unit.

5. Transmission mechanism comprising a first transmission unit including an input shaft and an output shaft, a pair of clutch shafts, gearing connecting the input shaft to the clutch shafts for driving them in opposite directions, a clutch associated with each of said shafts, means for selectively engaging one of said clutches and simultaneously disengaging the other of said clutches, gearing connecting said clutch shafts to said output shaft and including gear trains of different ratios serving to drive said output shaft at different speeds when the respective clutches are engaged, said last-named gearing also including multi-speed gearing shiftable for varying the speed of rotation of said output shaft with either of the clutches engaged, a second transmission unit including an input shaft coupled to the output shaft of the first unit and an output shaft adapted to drive a desired unit, a pair of trains of gears interposed between the input shaft of the second unit and the output shaft thereof, one of said trains of gears serving to drive the output shaft in one direction and the other serving to drive the output shaft in an opposite direction, said trains of gears also serving to vary the speed of rotation in each direction, and means for selecting either of said trains of gears to drive said output shaft of the second transmission unit, and a single control lever for actuating the clutches of said first transmission unit and the gear train selecting means of said second transmission unit, said control lever being connected to the clutch-actuating means and the gear train selecting means so as to permit movement of said lever to first select one of said gear trains and then to actuate said clutches, the means for connecting the lever to the clutch-actuating means and the gear train selecting means comprising an axially movable pin connected to the gear train selecting means, a pair of axially movable pins connected to the clutch-actuating means and disposed in spaced parallel relationship to each other and at right angles to said first-mentioned pin, all of said pins being associated with the lower end of said lever which is pivoted intermediate its ends for universal swinging movement, said lever engaging a channel-shaped member carried by the first-mentioned pin at right angles to the axis of the pin so that the lever is free to swing at right angles relative to the pin but will move the pin when swung in the direction of its axis, each of said second-named pins having lever-engaging forks into one of which the lower end of the lever will swing upon movement of said first-named pin, said forks being engageable by the lever when swung in a direction corresponding to the direction of the axes of said second-named pins so as to move one of said pins to actuate said clutches.

6. Transmission mechanism according to claim 1 including a control lever connected to shift said shiftable gearing which is interposed between the intermediate shaft and the output shaft and also connected to said means for selectively engaging and disengaging the clutches, said connection permitting shifting of said gearing and then actuation of said clutches.

7. Transmission mechanism according to claim 3 wherein a single control lever is provided for actuating the clutches of said first transmission unit and the gear train selecting means of said second transmission unit, said control lever being connected to the clutch actuating means and the gear train selecting means so as to permit movement of said lever to first select one of said gear trains and then to actuate said clutches.

WILLIAM G. VAN VOORHIS.
CHRIS GERST.

REFERENCES CITED

The following references are of record in the file of this patent:

UNITED STATES PATENTS

| Number | Name | Date |
|---|---|---|
| 1,458,469 | Donon | June 12, 1923 |
| 1,724,202 | Jacobs | Aug. 13, 1929 |
| 1,999,612 | Larsen | Apr. 30, 1935 |
| 2,326,911 | Aikman | Aug. 17, 1943 |
| 2,331,704 | Lange | Oct. 12, 1943 |
| 2,443,313 | Gerst | June 15, 1948 |

FOREIGN PATENTS

| Number | Country | Date |
|---|---|---|
| 229,055 | Great Britain | Feb. 19, 1925 |
| 350,282 | Great Britain | June 11, 1931 |
| 529,482 | Great Britain | Nov. 21, 1940 |
| 733,013 | France | Sept. 29, 1932 |
| 743,908 | France | Apr. 8, 1933 |